United States Patent
Nakagawa et al.

(10) Patent No.: US 12,479,869 B2
(45) Date of Patent: Nov. 25, 2025

(54) CURING CATALYST USED FOR CURING OF POLYMER, METHOD FOR PRODUCING SAME, MOISTURE-CURABLE COMPOSITION, AND METHOD FOR PRODUCING CURED PRODUCT

(71) Applicant: NITTO KASEI CO., LTD., Osaka (JP)

(72) Inventors: Yuya Nakagawa, Osaka (JP); Kazunori Namba, Osaka (JP); Haruka Yoshiyama, Osaka (JP); Yuji Imada, Osaka (JP); Nanae Kikui, Osaka (JP)

(73) Assignee: NITTO KASEI CO., LTD., Osaka (JP)

( * ) Notice: Subject to any disclaimer, the term of this patent is extended or adjusted under 35 U.S.C. 154(b) by 605 days.

(21) Appl. No.: 18/002,463

(22) PCT Filed: Jun. 23, 2021

(86) PCT No.: PCT/JP2021/023729
§ 371 (c)(1),
(2) Date: Dec. 19, 2022

(87) PCT Pub. No.: WO2022/004511
PCT Pub. Date: Jan. 6, 2022

(65) Prior Publication Data
US 2023/0234976 A1 Jul. 27, 2023

(30) Foreign Application Priority Data
Jun. 29, 2020 (JP) .................. 2020-111531

(51) Int. Cl.
*C07F 7/28* (2006.01)
*C08G 77/08* (2006.01)

(52) U.S. Cl.
CPC ............. *C07F 7/28* (2013.01); *C08G 77/08* (2013.01)

(58) Field of Classification Search
CPC ....... C07C 211/63; C07F 7/28; C08G 65/336; C08G 77/08; C08G 77/458; C08L 101/10
See application file for complete search history.

(56) References Cited

U.S. PATENT DOCUMENTS

| | | | |
|---|---|---|---|
| 4,546,017 A | 10/1985 | Flackett et al. | |
| 6,096,910 A | 8/2000 | Yamamoto et al. | |
| 2009/0163662 A1 | 6/2009 | Yasuda et al. | |
| 2020/0362173 A1 | 11/2020 | Yoshiyama | |

FOREIGN PATENT DOCUMENTS

| | | | |
|---|---|---|---|
| CN | 108973282 | | 12/2018 |
| EP | 4 067 338 A1 | | 10/2022 |
| EP | 4 174 050 | | 5/2023 |
| EP | 4 180 482 | | 5/2023 |
| JP | 60-161457 A | | 8/1985 |
| JP | 63-42942 A | | 2/1988 |
| JP | 08-41358 A | | 2/1996 |
| JP | 2000-107604 A | | 4/2000 |
| JP | 2003-147220 A | | 5/2003 |
| JP | 2006-218420 A | | 8/2006 |
| JP | 5446265 B2 | | 3/2014 |
| JP | 2014-114434 A | | 6/2014 |
| JP | 2016-224198 A | | 12/2016 |
| KR | 20090046706 A | * 5/2009 | ............... C09D 4/00 |
| WO | 2008/023713 A1 | | 2/2008 |
| WO | 2019/098112 A1 | | 5/2019 |
| WO | 2021/106943 A1 | | 6/2021 |

OTHER PUBLICATIONS

Machine translation of Hashimoto et al (KR20090046706) (Year: 2009).*
Chinese Office Action and machine translation thereof for Appln. No. 202180032096.8, mailed Jan. 24, 2024, 18 pages.
Song Yi, et al., "Recent Advance in Synthesis of Microporous Molecular Sieve", Petrochemical Technology, vol. 34, issue 9, pp. 807-812, Sep. 30, 2005,(6 pages), English Abstract included.
International Search Report mailed Aug. 17, 2021, issued in corresponding International Application No. PCT/JP2021/023729, filed Jun. 23, 2021, 2 pages.
Extended European Search Report for EP 21834475.2, mailed Oct. 31, 2023, (5 pages).

* cited by examiner

*Primary Examiner* — Brian A Mccaig
(74) *Attorney, Agent, or Firm* — Christensen O'Connor Johnson Kindness PLLC

(57) ABSTRACT

Provided is a curing catalyst having a high safety and a practical curing rate.
According to the present invention, provided is a curing catalyst [B] used for curing a polymer [A] having a reactive hydrolyzable silicon-containing group, wherein
the curing catalyst [B] contains a complex of a titanium compound [B1] and an ammonium hydroxide [B2], and an amine compound [B3],
the titanium compound [B1] is represented by Chemical Formula (1),
the ammonium hydroxide [B2] is represented by Chemical Formula (2), and
the amine compound [B3] is represented by Chemical Formula (3), Chemical Formula (4), or Chemical Formula (5).

7 Claims, No Drawings

CURING CATALYST USED FOR CURING OF POLYMER, METHOD FOR PRODUCING SAME, MOISTURE-CURABLE COMPOSITION, AND METHOD FOR PRODUCING CURED PRODUCT

CROSS-REFERENCES TO RELATED APPLICATIONS

This application is a National Stage of International Application No. PCT/JP2021/023729 filed Jun. 23, 2021, which claims the benefit of Japanese Application No. 2020-111531, filed on June 29. 2020, the disclosures of which are expressly incorporated herein by reference in their entirety.

TECHNICAL FIELD

The present invention relates to a curing catalyst used for curing a polymer, a method for producing the curing catalyst, a moisture-curable composition, and a method for producing a cured product.

BACKGROUND ART

One-pack type moisture-curable rubber compositions generally have a high curing rate and do not require weighing and mixing of various additives such as a base polymer, a cross-linking agent and a catalyst before use, and therefore is superior in workability as compared with the two-pack type.

As these one-pack type moisture-curable rubber compositions, silicone-based rubber, modified silicone-based rubber, urethane-based rubber, polysulfide-based rubber and the like are known.

Organopolysiloxane compositions are widely used as the one-pack type moisture-curable rubber composition of the silicone-based rubber, and cure at room temperature to form a rubber elastic body. Siloxane polymer compounds having a main chain of —Si—O— bonds obtained by crosslinking and polymerizing organosiloxanes are widely used in the fields of construction, civil engineering, electricity, electronics, automobile, etc. because of their excellent properties such as water repellency, heat resistance, weather resistance, cold resistance, and electrical insulation.

As the one-pack type moisture-curable rubber composition of modified silicone-based rubber, there is a composition containing a polymer having a polyether as a main chain and having a crosslinkable reactive hydrolyzable silicon functional group. The curable composition of this polymer has better storage stability, weather resistance, foaming resistance and discoloration resistance than those of the urethane-based rubber, and has better curability than that of the polysulfide-based rubber, and has little pollution to the surroundings and no toxicity.

It is considered that the reaction mechanism of the process in which the silicone-based rubber and the modified silicone-based rubber become a cured product is based on a condensation reaction or an addition reaction of a reactive hydrolyzable silicon-containing group in the presence of water, and the polymerization proceeds to form a cured polymer having a three-dimensional network structure. A curing catalyst is used to accelerate the curing process in this reaction (Patent Literatures 1 to 5).

CITATION LIST

Patent Literature

[Patent Literature 1] JP-A-Hei8-41358
[Patent Literature 2] JP-A-Sho60-161457
[Patent Literature 3] JP-B-Sho63-42942
[Patent Literature 4] JP-A-2003-147220
[Patent Literature 5] JP-B-5446265

SUMMARY OF INVENTION

Technical Problem

As a curing catalyst for the cured composition of the silicone-based rubber and modified silicone-based rubber having the reactive hydrolyzable silicon-containing group, tin carboxylate compounds, alkyltin salt compounds and the like have been used, but there are concerns about their effects on living organisms as endocrine disruptors. Therefore, as a moisture-curable composition which does not use such substances, a combined catalyst of a carboxylic acid and an amine (Patent Literature 1) has been proposed. However, there is a problem that a sufficient curing rate cannot be obtained during operation.

In Patent Literatures 2 and 3, the use of a titanium acid ester compound such as diisopropoxy titanium bis (alkyl acetoacetonate) as a catalyst has been proposed. However, there is a problem that the compound is easily decomposed by moisture contained in additives and fillers in the composition, and the curing rate varies due to humidity during operation, so that a stable cured product cannot be obtained.

In Patent Literature 4, the use of a titanium tetracarboxylate compound as a catalyst has been proposed. In this case, however, a practical curing rate cannot be obtained.

In Patent Literature 5, the use of a quaternary ammonium salt as a catalyst has been proposed. In this case, however, a sufficient curing rate cannot be obtained during construction.

Therefore, it has been desired to develop a curing catalyst having a high safety (low toxicity and low environmental pollution) and a practical curing rate.

In view of the above-mentioned prior art, an object of the present invention is to provide a curing catalyst having a high safety and a practical curing rate.

Solution to Problem

According to the present invention, provided is a curing catalyst [B] used for curing a polymer [A] having a reactive hydrolyzable silicon-containing group, wherein the curing catalyst [B] contains a complex of a titanium compound [B1] and an ammonium hydroxide [B2], and an amine compound [B3], the titanium compound [B1] is represented by Chemical Formula (1), the ammonium hydroxide [B2] is represented by Chemical Formula (2), and the amine compound [B3] is represented by Chemical Formula (3), Chemical Formula (4), or Chemical Formula (5).

As a result of intensive studies, the present inventors have found that a curing rate of the polymer [A] is drastically enhanced in a case of using the curing catalyst [B] containing the complex of the titanium compound [B1] and the ammonium hydroxide [B2], and the amine compound [B3], thereby leading to completion of the present invention. Since this catalyst does not contain tin, it is highly safe and can be manufactured at low cost.

DESCRIPTION OF EMBODIMENTS

Hereinafter, the present invention will be explained in detail.

The curing catalyst [B] of the present invention is used for curing a polymer [A] having a reactive hydrolyzable silicon-containing group. The polymer [A] is preferably liquid at room temperature.

1. Polymer [A]

The polymer [A] has at least one reactive hydrolyzable silicon-containing group per molecule at a molecular terminal or a side chain. The reactive hydrolyzable silicon-containing group may be present at the terminal of the polymer [A] molecule, may be present in the side chain, and may be present at both the terminal and the side chain. The number of reactive hydrolyzable silicon-containing groups may be at least one per molecule of the polymer [A], but from the viewpoint of the curing rate and physical properties of the cured product, it is preferable that the number is 1.5 or more per molecule on average. A known method can be adopted as a method of bonding the reactive hydrolyzable silicon-containing group to the main chain of the polymer.

The reactive hydrolyzable silicon-containing group is a group having a silicon atom bonded to a reactive group consisting of a hydrolyzable group (e.g., halogen, alkoxy, alkenyloxy, acyloxy, amino, aminooxy, oxime, amide) or a hydroxyl group, and has a property of causing a condensation reaction by using a catalyst or the like as necessary in the presence of moisture or a crosslinking agent. Specifically, examples of the reactive hydrolyzable silicon-containing group include a halogenated silyl group, an alkoxysilyl group, an alkenyloxysilyl group, an acyloxysilyl group, an aminosilyl group, an aminooxysilyl group, an oximesilyl group, and an amidesilyl group and the like.

The number of reactive hydrolyzable groups bonded to one silicon atom is selected from the range of 1 to 3. In addition, the reactive hydrolyzable group bonded to one silicon atom may be one or more kinds. Further, a reactive hydrolyzable group and a non-reactive hydrolyzable group may be bonded to one silicon atom, or a hydrolyzable group and a hydroxyl group may be bonded to one silicon atom. As the reactive hydrolyzable silicon-containing group, the alkoxysilyl group (including a monoalkoxysilyl group, a dialkoxysilyl group, and a trialkoxysilyl group) is particularly preferable in terms of easy handling.

Among the above-mentioned alkoxysilyl groups, the trialkoxysilyl group is preferred because it has high activity and provides good curability, and the resulting cured product has excellent resilience, durability and creep resistance. On the other hand, the dialkoxysilyl group and monoalkoxysilyl group are preferable because they have excellent storage stability and the resulting cured product has high elongation and high strength.

By using the polymer [A] in which the reactive hydrolyzable silicon-containing group is a dialkoxysilyl group in combination with the polymer [A] in which the reactive hydrolyzable silicon-containing group is a trialkoxysilyl group, the physical properties and curability of the cured product can be balanced.

Examples of the polymer [A] include an organic polymer [A1] and an organopolysiloxane [A2].

(Organic Polymer [A1])

The main chain of the organic polymer [A1] used in the present invention includes one having a carbon atom, for example, an alkylene oxide polymer, a polyester polymer, an ether/ester block copolymer, a polymer of ethylenically unsaturated compound, a polymer of diene-based compound and the like.

Examples of the alkylene oxide polymer include those having one or more kinds of repeating units such as

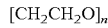

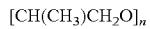

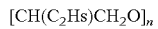

Here, n is the same or different and is an integer of 2 or more. These alkylene oxide polymers may be used alone or in combination of two or more kinds. Further, a copolymer containing two or more kinds of the above repeating units may also be used.

Examples of the polyester polymer include those having a carboxylic acid such as acetic acid, propionic acid, maleic acid, phthalic acid, citric acid, pyruvic acid, lactic acid, and an anhydride thereof, an intramolecular and/or intermolecular ester thereof and a substituted product thereof as a repeating unit.

Examples of the ether/ester block copolymer include those having both a repeating unit used in the above-described alkylene oxide polymer and a repeating unit used in the above-described polyester polymer as a repeating unit.

Further, Examples of the polymer of the ethylenically unsaturated compound and the diene-based compound include a homopolymer of ethylene, propylene, acrylate, methacrylate, vinyl acetate, acrylonitrile, styrene, isobutylene, butadiene, isoprene, or chloroprene and the like, and a copolymer of two or more of these compounds. More specifically, polybutadiene, styrene-butadiene copolymer, acrylonitrile-butadiene copolymer, ethylene-butadiene copolymer, ethylene-propylene copolymer, ethylene-vinyl acetate copolymer, ethylene-(meth) acrylate copolymer, polyisoprene, styrene-isoprene copolymer, isobutylene-isoprene copolymer, polychloroprene, styrene-chloroprene copolymer, acrylonitrile-chloroprene copolymer, polyisobutylene, polyacrylate, polymethacrylate and the like can be mentioned. These polymers may be used alone or in combination of two or more kinds.

As the organic polymer [A1], an organic polymer having a polar group such as a nitrogen-containing characteristic group in the molecule may also be used. Specific examples of the nitrogen-containing characteristic group include those represented by a (thio) urethane group, an allophanate group, a bonding group derived from a (thio) urethane group such as other N-substituted urethane groups and an N-substituted allophanate group, a (thio) urea group, a biuret group, other N-substituted urea groups, an N,N'-substituted urea group, a bonding group derived from a (thio) urea group such as an N-substituted biuret group and an N,N'-substituted biuret group, an amide group, a bonging group derived from an amide group such as an N-substituted amide group, a bonding group derived from an imino group, a (thio) ester group, a (thio) ether group and the like, but are not limited thereto. Among these groups, the nitrogen-containing characteristic group is preferable in terms of high curability, and the bonding group derived from a (thio) urethane group and the bonding group derived from a (thio) urea group are more preferable in terms of ease of synthesis. Further, only one nitrogen-containing characteristic group may be contained in the organic polymer [A1], and one or more kinds of a plurality of nitrogen-containing characteristic groups may be contained in the organic polymer [A1]. Here, the terms of "(thio)" and "N-substituted" are the same as above.

When the organic polymer [A1] contains a polar group such as the nitrogen-containing characteristic group, the toughness of the cured product is improved, and the curability and adhesive strength are increased. In particular, when the cross-linkable silicon group is linked to the main chain via a polar group such as the nitrogen-containing characteristic group, the curability is further improved. The reason for this is that the polar groups of the nitrogen-containing characteristic groups strongly attract each other due to an interaction such as a hydrogen bond. It is considered that when the polar groups of the nitrogen-containing characteristic groups strongly attract each other, the molecules of the curable resin also strongly bind to each other (form a domain), thereby exhibiting toughness in the cured product. Further, when the cross-linkable silicon group is linked to the main chain via a polar group such as the nitrogen-containing characteristic group, the cross-linkable silicon groups are also close to each other while the nitrogen-containing characteristic groups form a domain with each other.

Thereby, the contact probability between the cross-linkable silicon groups is also improved, and further, the condensation reactivity between the cross-linkable silicon groups is improved by the catalytic curing by the polar group in the nitrogen-containing characteristic group.

Such an organic polymer [A1] (modified silicone-based polymer) may be produced by a known method such as the method described in JP—B-Sho61-18569, or is commercially available. Commercially available products include, for example, Kaneka MS polymer series (MS polymer S203, MS polymer S303, MS polymer S903, MS polymer S911, MS polymer SAX520 etc.), Silyl series (Silyl polymer SAT200, Silyl polymer MA430, Silyl polymer MAX447 etc.), MA series, SA series, OR series available from Kaneka Corporation; ES series (ES-GX3440ST etc.), ESGX series etc. available from AGC Corporation.

The number average molecular weight of the organic polymer [A1] used in the present invention is not particularly limited. However, an excessively high molecular weight compound has a high viscosity, and when used in a curable composition, it becomes difficult to use the composition. Thus, the number average molecular weight of the organic polymer [A1] is desirably 30,000 or less. Such an organic polymer may be produced by a known method, and a commercially available product such as the above-described Kaneka MS polymer available from Kaneka Corporation may be used.

(Organopolysiloxane [A2])

The organopolysiloxane [A2] used in the present invention has a main chain composed of a siloxane bond represented by Si—O, and further has an organic group bonded to a silicon atom constituting the siloxane bond. Specific examples of such organic groups include alkyl groups such as methyl, ethyl, propyl, and butyl; cycloalkyl groups such as cyclohexyl; alkenyl groups such as vinyl, isopropenyl, substituted vinyl; allyl groups, crotyl, substituted allyl groups such as methallyl; aryl groups such as phenyl, toluyl, and xylyl; aralkyl groups such as benzyl and phenylethyl; and groups in which all or part of the hydrogen atoms of these organic groups have been substituted with halogen atoms, such as a chloromethyl group and a 3,3,3-trifluoropropyl group.

Examples of the organopolysiloxane [A2] include those having a repeating unit represented by the following formula.

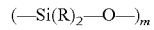

(In the formula, R represents the same or different organic groups, and m represents an integer of 2 or more.) Specific examples include those having one or more kinds of repeating units such as

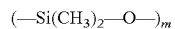

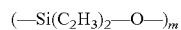

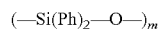

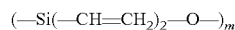

Here, m is the same or different and is an integer of 2 or more. The organopolysiloxane [A2] may be composed of a single main chain, or may be composed of two or more main chains.

The organopolysiloxane may be linear or branched including a trifunctional form (R'SiO$_{1.5}$) or a tetrafunctional form (R'SiO$_2$). Also, a bifunctional form (R'$_2$SiO) and a monofunctional form (R'$_3$SiO$_{0.5}$) (wherein R' is an organic group) may be combined depending on physical property and application of the cured product on an as needed basis. Furthermore, the hydrolyzable silicon-containing group may be bonded to a molecular terminal or to a middle of a molecular chain.

It should be noted that the organopolysiloxane is generally represented by an average composition formula of R$_a$SiO$_{4-a/2}$ (e.g., JP-A-2005-194399 and JP-A-Hei8-151521). The notations above are based on this.

The viscosity of the organopolysiloxane [A2] used in the present invention is not particularly limited, but if the viscosity is excessively high, the workability may be reduced or the physical properties of the resulting cured product may be impaired. Thus, the viscosity at 25° C. is desirably in the range of 0.025 to 100 Pa s.

Such an organopolysiloxane may be produced by a known method, and commercial products such as Tosseal series available from GE Toshiba Silicone Co., Ltd., Sealant series available from Shin-Etsu Chemical Co., Ltd., and SH series available from Toray Dow Corning Co., Ltd. may be used.

2. Curing Catalyst [B]

The curing catalyst [B] contains a complex of a titanium compound [B1] and an ammonium hydroxide [B2], and an amine compound [B3]. This complex is a reaction product that can be obtained by reacting the titanium compound [B1] with the ammonium hydroxide [B2].

<Titanium Compound [B1]>

The titanium compound [B1] is represented by Chemical Formula (1),

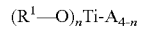     (1)

in Chemical Formula (1), R$^1$ is a substituted or unsubstituted hydrocarbon group, n is 1 to 4, and A is a @-diketone group.

For example, n is 1, 1.5, 2, 2.5, 3, 3.5, or 4, and may be in the range between the two values exemplified herein.

The substituted or unsubstituted hydrocarbon group represented as R is a hydrocarbon group that is substituted or unsubstituted and aliphatic or aromatic, and preferably an aliphatic hydrocarbon group.

Examples of the hydrocarbon group include alkyl groups such as methyl, ethyl, propyl, isopropyl, butyl, isobutyl, sec-butyl, tert-butyl, pentyl, hexyl, heptyl, octyl, 2-ethylhexyl, nonyl, and decyl, and oxyalkylene groups.

Preferably, at least one of $R_1$ is an alkyl group having 8 or more carbon atoms or an oxyalkylene group. Preferably, at least one of Riis a hydrocarbon group that is neither an alkyl group having 8 or more carbon atoms nor an oxyalkylene group (other hydrocarbon groups). The number of carbon atoms of the other hydrocarbon group is, for example, 1 to 7, and preferably 1 to 5. The number of carbon atoms is, specifically for example, 1, 2, 3, 4, 5, 6, or 7, and may be in the range between the two values exemplified herein. The other hydrocarbon group is preferably an alkyl group, and more preferably a branched alkyl group. The number of the other hydrocarbon group is 0, 1, 2, 3, or 4.

The number of carbon atoms of the alkyl group having 8 or more carbon atoms is, for example, 8 to 20, and preferably 8 to 15. The number of carbon atoms is, specifically for example, 8, 9, 10, 11, 12, 13, 14, 15, 16, 17, 18, 19, or 20, and may be in the range between the two values exemplified herein.

The oxyalkylene group is represented by Chemical Formula (6).

The number of atoms in a main chain of the oxyalkylene group is, for example, 4 to 20, and more preferably 6 to 14. The number of atoms is, specifically for example, 4, 5, 6, 7, 8, 9, 10, 11, 12, 13, 14, 15, 16, 17, 18, 19, or 20, and may be in the range between the two values exemplified herein.

Here, $R^{15}$ is a substituted or unsubstituted hydrocarbon group having 1 to 10 carbon atoms, $R^{16}$ is a substituted or unsubstituted hydrocarbon group having 2 to 10 carbon atoms, and p represents an integer of 1 to 10.

The number of carbon atoms in $R^{15}$ is preferably 1 to 6, and more preferably 1 to 4. The number of carbon atoms in $R^{1F}$ is preferably 2 to 6, and more preferably 2 to 3. p is preferably 1 to 6, and more preferably 1 to 2.

Examples of the oxyalkylene group include groups obtained by removing a terminal hydroxyl group from alcohol such as ethylene glycol monomethyl ether, ethylene glycol monoethyl ether, ethylene glycol monopropyl ether, ethylene glycol monobutyl ether, ethylene glycol monopentyl ether, ethylene glycol monoisopropyl ether, ethylene glycol mono t-butyl ether, diethylene glycol monomethyl ether, diethylene glycol monoethyl ether, diethylene glycol monopropyl ether, diethylene glycol monobutyl ether, diethylene glycol monopentyl ether, diethylene glycol monoisopropyl ether, diethylene glycol mono t-butyl ether, propylene glycol monomethyl ether, propylene glycol monoethyl ether, propylene glycol monopropyl ether, propylene glycol monobutyl ether, propylene glycol monopentyl ether, propylene glycol monoisopropyl ether, propylene glycol mono t-butyl ether, dipropylene glycol monomethyl ether, dipropylene glycol monoethyl ether, dipropylene glycol monopropyl ether, dipropylene glycol monobutyl ether, dipropylene glycol monopentyl ether, dipropylene glycol monoisopropyl ether and dipropylene glycol mono-t-butyl ether. For example, the oxyalkylene group is 2-(2-butoxyethoxy)ethyl if the alcohol is butylcarbitol (also known as 2-(2-butoxyethoxy)ethanol), and is 2-butoxyethyl if the alcohol is butyl cellosolve (also known as 2-butoxyethanol).

Examples of the β-diketone group represented as A include 2,4-pentanedione; 2,4-hexanedione,; 2,4-pentadecanedione; 2,2,6,6-tetramethyl-3,5-heptanedione; 1-aryl-1,3-butanedione such as 1-phenyl-1,3-butanedione and 1-(4-methoxyphenyl)-1,3-butanedione; 1,3-diaryl-1,3-propanedione such as 1,3-diphenyl-1,3-propanedione, 1,3-bis(2-pyridyl)-1,3-propanedione and 1,3-bis(4-methoxyphenyl)-1,3-propanedione; diketones such as 3-benzyl-2,4-pentanedione; ketoesters such as methylacetoacetate, ethylacetoacetate, butylacetoacetate, t-butylacetoacetate and ethyl-3-oxohexanoate; ketoamides such as N,N-dimethylacetamide, N,N-diethylacetamide and acetoacetanilide; malonic acid esters such as dimethylmalonate, diethylmalonate and diphenylmalonate; malonamides such as N,N,N',N'-tetramethylmalonamide and N,N,N',N'-tetraethylmalonamide. In particular, diketones such as 2,4-pentanedione, 1-aryl-1,3-butanedione and 1,3-diaryl-1,3-propanedione are preferred.

Of the titanium compounds represented by Chemical Formula (1), tetraisopropoxy titanium, triisopropoxy 2-(2-butoxyethoxy) ethoxy titanium, and triisopropoxy 2-butoxyethoxy titanium are more preferred in terms of catalytic activity, compound stability and handling.

The above-described titanium compound [B1] may be used singly or in combination with two or more kinds.
<Ammonium Hydroxide [B2]>

The ammonium hydroxide [B2] is represented by the following formula.

[Chem. 2]

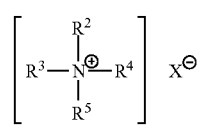

(2)

In Chemical Formula (2), $R^2$, $R^3$, $R^4$ and $R^5$ represent hydrocarbon groups having 1 to 8 carbon atoms, which are the same as or different from each other, and X represents a hydroxyl group.

Substituted or unsubstituted hydrocarbon groups represented as $R^2$, $R^3$, $R^4$ and $R^5$ are substituted or unsubstituted hydrocarbon groups that are aliphatic or aromatic, and preferably aliphatic hydrocarbon groups. Linear or branched alkyl groups are preferred as aliphatic hydrocarbon groups. The number of carbon atoms in the hydrocarbon group is 1 to 8, preferably 1 to 6, and more preferably 1 to 4. The number of carbon atoms is, specifically for example, 1, 2, 3, 4, 5, 6, 7, or 8, and may be in the range between the two values exemplified herein. Examples of the aliphatic hydrocarbon group include saturated hydrocarbon groups such as a methyl group, an ethyl group, a propyl group, an isopropyl group, a butyl group, an isobutyl group, a pentyl group, a hexyl group, a cyclohexyl group, a heptyl group and an octyl group; and unsaturated groups such as a vinyl group, an allyl group, a prenyl group, a crotyl group, a cyclopentadienyl group. The methyl group, the ethyl group and the butyl group are preferred as the aliphatic hydrocarbon group.

A phenyl group, a tolyl group and a benzyl group are cited as examples of the aromatic hydrocarbon group.

A methoxy group, an ethoxy group, a hydroxy group and an acetoxy group are cited as examples of a substituted group of the hydrocarbon group. Alkoxyalkyl groups such as a methoxymethyl group, methoxyethyl group, an ethoxymethyl group and an ethoxyethyl group; and hydroxyalkyl groups such as a hydroxymethyl group, a hydroxyethyl group and a 3-hydroxypropyl group; and a 2-acetoxyethyl group are cited as examples of the substituted aliphatic or aromatic hydrocarbon group.

Specific examples of the ammonium hydroxide represented by Chemical Formula (2) include tetramethylammonium hydroxide, tetraethylammonium hydroxide, tetrapropylammonium hydroxide, tetrabutylammonium hydroxide, trimethylbenzylammonium hydroxide, benzyltriethylammonium hydroxide, trimethylphenylammonium hydroxide and tris (2-hydroxyethyl)methylammonium hydroxide. In particular, tetrabutylammonium hydroxide is preferred.

<Reaction of Titanium Compound [B1] with Ammonium Hydroxide [B2]>

The complex of the titanium compound [B1] and the ammonium hydroxide [B2] is, for example, transparent liquid and can be obtained by reacting a mixture thereof at a temperature of 40 to 100° C. This temperature is, specifically for example, 40, 50, 60, 70, 80, 90 or 100° C., and may be in the range between the two values exemplified herein. A molar ratio of the titanium compound [B1] to the ammonium hydroxide [B2] is, for example, 0.1 to 100, specifically 0.1, 0.5, 1, 2, 3, 4, 5, 6, 7, 8, 9, 10, 20, 50, or 100, and may be in the range between the two values exemplified herein.

<Amine Compound [B3]>

The amine compound [B3] is represented by Chemical Formula (3), Chemical Formula (4), or Chemical Formula (5).

[Chem. 3]

$$R^6\text{—}N\text{=}CR^7\text{—}NR^8_2 \quad (3)$$

In chemical Formula (3), $R^6$, $R^7$, and $R^8$ represent hydrogen atoms or substituted or unsubstituted hydrocarbon groups having 1 to 20 carbon atoms, which are the same as or different from each other, and two $R^8$ may be the same as or different from each other. Any two or more of $R^6$, R' and two $R^8$ may be bonded to each other to form a cyclic structure.

The hydrocarbon groups represented as $R^6$, $R^7$, and $R^8$ are substituted or unsubstituted hydrocarbon groups that are aliphatic or aromatic, and preferably aliphatic hydrocarbon groups. Linear or branched alkyl groups, or alkylene groups are preferred as the hydrocarbon groups.

Examples of the cyclic structure include a first cyclic structure constituted by bonding one of $R^4$ and $R^6$, and a second cyclic structure constituted by bonding the other $R^8$ and $R^7$. Preferably at least one of the first cyclic structure and the second cyclic structure is formed, and more preferably both are formed. The number of atoms constituting each ring for the first cyclic structure and the second cyclic structure is preferably 4 to 10, more preferably 5 to 8, and even more preferably 6.

The numbers of carbon atoms in $R^6$, $R^7$ and $R^8$ are preferably 1 to 8, more preferably 1 to 6, and even more preferably 1 to 4, if $R^6$, $R^7$ and $R^8$ are not bonded to each other. The number of carbon atoms is, for example, 1, 2, 3, 4, 5, 6, 7, or 8, and may be in the range between the two values exemplified herein. Examples of the aliphatic hydrocarbon group include saturated hydrocarbon groups such as a methyl group, an ethyl group, a propyl group, an isopropyl group, a butyl group, an isobutyl group, a pentyl group, a hexyl group, a cyclohexyl group, a heptyl group and an octyl group; and unsaturated groups such as a vinyl group, an allyl group, a prenyl group, a crotyl group, a cyclopentadienyl group. The methyl group, the ethyl group and the butyl group are preferred as the aliphatic hydrocarbon group.

Examples of the amidine compound represented by Chemical Formula (3) include 1,8-diazabicyclo[5,4,0]undecen-7 (DBU), 6-(dibutylamino)-1,8-diazabicyclo[5,4,0]undecen-7 (DBA-DBU), 6-(2-hydroxypropyl)-1,8-diazabicyclo[5,4,0]undeca-7-ene (OH-DBU), 1,5-diazabicyclo[4,3,0]nonen-5 (DBN), and 1,4-diazabicyclo[2,2,2]octane (DABCO).

[Chem. 4]

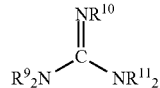

(4)

In Chemical Formula (4), $R^9$, $R^{10}$, and $R^{11}$ represent hydrogen atoms or substituted or unsubstituted hydrocarbon groups having 1 to 20 carbon atoms, which are the same as or different from each other, and two $R^9$ and two $R^{11}$ may each be the same as or different from each other. Any two or more of two $R^9$, $R^{10}$ and two $R^{11}$ may be bonded to each other to form a cyclic structure.

The hydrocarbon groups represented as $R^9$, $R^{10}$ and $R^{11}$ are substituted or unsubstituted hydrocarbon groups that are aliphatic or aromatic, and preferably aliphatic hydrocarbon groups. Linear or branched alkyl groups, or alkylene groups are preferred as the hydrocarbon groups.

Examples of the cyclic structure include a first cyclic structure constituted by bonding one of $R^{11}$ and $R^{10}$, and a second cyclic structure constituted by bonding the other $R^{11}$ and one of $R^9$. At least one of the first cyclic structure and the second cyclic structure may be formed, and both may be formed. The number of atoms constituting each ring for the first cyclic structure and the second cyclic structure is preferably 4 to 10, more preferably 5 to 8, and even more preferably 6.

The numbers of carbon atoms in $R^9$, $R^{10}$ and $R^{11}$ are preferably 1 to 15, preferably 1 to 8, more preferably 1 to 6, and even more preferably 1 to 4, if $R^9$, $R^{10}$ and $R^{11}$ are not bonded to each other. Other explanations of $R^9$, $R^{10}$ and $R^{11}$ are the same as those of $R^6$, $R^7$ and R©.

Examples of the guanidine compound represented by Chemical Formula (4) include guanidine compounds such as 1,1,2-trimethylguanidine, 1,2,3-trimethylguanidine, 1,1,3,3-tetramethylguanidine, 1,1,2,2,3-pentamethylguanidine, 2-ethyl-1,1,3,3-tetramethylguanidine, 1-benzylguanidine, 1,3-dibenzylguanidine, 1-benzyl-2,3-dimethylguanidine, 1-phenylguanidine, 1-(o-tolyl)guanidine, 1-(3-methylphenyl)guanidine, 1-(4-methylphenyl)guanidine, 1-(2-chlorophenyl)guanidine, 1-(4-chlorophenyl)guanidine, 1-(2,3-xylyl)guanidine, 1-(2,6-xylyl)guanidine, 1-(1-naphthyl) guanidine, 2-phenyl-1,3-dicyclohexylguanidine, 1-phenyl-1-methylguanidine, 1-(4-chlorophenyl)-3-(1-methylethyl) guanidine, 1-(4-methylphenyl)-3-octylguanidine, 1-(4-methoxyphenyl)guanidine, 1,1'-[4-(dodecyloxy)-m-phenylene]bisguanidine, 1-(4-nitrophenyl)guanidine, 4-guanidino benzoic acid, 2-(phenylimino)imidazolidine, 2-(5,6,7,8-tetrahydronaphthalen-1-ylamino)-2-imidazoline, N-(2-imidazolin-2-yl)-2,3-xylidine, N-(2-imidazolin-2-yl)-1-naphthaleneamine, 1,1'-[methylenebis(p-phenylene)]bisguanidine, 1,5,7-triazabicyclo[4.4.0]-deca-5-ene, 7-methyl-1,5,7-triazabicyclo[4.4.0]-deca-5-ene, 7-n-propyl-1,5,7-triazabicyclo[4.4.0]-deca-5-ene, 7-isopropyl-1,5,7-triazabicyclo[4.4.0]-deca-5-ene, 7-n-butyl-1,5,7-triazabicyclo [4.4.0]-deca-5-ene, 7-n-cyclohexyl-1,5,7-triazabicyclo[4.4.0]-deca-5-ene, and 2,3,5,6-tetrahydro-3-phenyl-1H-imidazo[1,2-a]imidazole; and biguanide compounds such as 1-methylbiguanide, 1-n-butyl biguanide, 1-(2-ethylhexyl)biguanide, 1-n-octadecyl biguanide, 1,1-dimethylbiguanide, 1,1-diethylbiguanide, 1-cyclohexyl biguanide, 1-allyl biguanide, 1-phenyl biguanide, 1-(o-tolyl) biguanide, 1-(3-methylphenyl) biguanide, 1-(4-methylphenyl)biguanide, 1-(2-chlorophenyl)biguanide, 1-(4-chlorophenyl)biguanide, 1-(2,3-xylyl)biguanide, 1-(2,6-xylyl) biguanide, 1-(1-naphthyl)biguanide, 1,3-diphenyl biguanide, 1,5-diphenyl biguanide, 1-phenyl-1-methylbiguanide, 1-(4-chlorophenyl)-5-(1-methylethyl)biguanide, 1-(4-methylphenyl)-5-octylbiguanide, 1-(4-methoxyphenyl) biguanide, 1-(3,4-dichlorophenyl)-5-(1-methylethyl)biguanide, 1,1'-hexamethylenebis[5-(4-chlorophenyl)biguanide], 2-guanidino-1H-benzoimidazole, 1-(4-nitrophenyl)biguanide, 1-benzyl biguanide, 1-(2-phenylethyl)biguanide, 3-(2-phenylethyl)biguanide, N,N-diamidinoaniline, 1,5-ethylene biguanide, 1-morpholino biguanide, 3-morpholino biguanide, 1-(4-chlorobenzyloxy)biguanide, 1-n-butyl-N2-ethyl biguanide, 1,1'-ethylene bis-biguanide, 1-[3-(diethylamino) propyl]biguanide, 1-[3-(dibutylamino)propyl]biguanide, N',N''-dihexyl-3,12-diimino-2,4,11,13-tetraazatetradecane-diamidine, 4-[3-(amidino)guanidino]benzenesulfonic acid, 1,2-diisopropyl-3-[bis(dimethylamino)methylene]guanidine, and 5-[3-(2,4,5-trichlorophenoxy)propoxy]-1-isopropylbiguanide.

[Chem. 5]

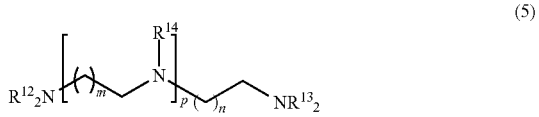

(5)

In Chemical Formula (5), $R^{12}$, $R^{13}$, and $R^{14}$ represent hydrogen atoms or substituted or unsubstituted hydrocarbon groups having 1 to 10 carbon atoms, which are the same as or different from each other, m is 1 to 10, n is 1 to 10, and p is 0 to 10. Any two or more of two $R^{12}$, two $R^{13}$, and p number of $R^{14}$ may be bonded to each other to form a cyclic structure.

Examples of the cyclic structure include a first cyclic structure constituted by bonding $R^1$ and $R^{13}$, and a second cyclic structure constituted by bonding $R^{12}$ and $R^{14}$, a third cyclic structure constituted by bonding $R^{13}$ and $R^{14}$, a fourth cyclic structure constituted by bonding two $R^{12}$ to each other, a fifth cyclic structure constituted by bonding two $R^{13}$ to each other, and a sixth cyclic structure constituted by bonding two $R^{14}$ to each other. One of the first to sixth cyclic structures may be formed, and two or more structures may be formed. The number of atoms constituting each ring for the first to sixth cyclic structures is preferably 4 to 10, more preferably 5 to 8, and even more preferably 6.

The numbers of carbon atoms in $R^{12}$, $R^{13}$ and $R^{14}$ are preferably 1 to 8, more preferably 1 to 6, and even more preferably 1 to 4, if $R^{12}$, $R^{13}$ and $R^{14}$ are not bonded to each other. Other explanations of $R^{12}$, $R^{13}$ and $R^{14}$ are the same as those of $R^6$, $R^7$ and $R^8$.

Each of m and n is 1 to 10, and more preferably 1 to 5. m and n are, specifically for example, 1, 2, 3, 4, 5, 6, 7, 8, 9, or 10, and may be in the range between the two values exemplified herein. p is 0 to 10, and preferably 0 to 5. p is, specifically for example, 0, 1, 2, 3, 4, 5, 6, 7, 8, 9, or 10, and may be in the range between the two values exemplified herein.

Examples of the polyamine compound represented by Chemical Formula (5) include ethylenediamine, trimethylenediamine, tetramethylenediamine, hexamethylenediamine, diethylenetriamine, dipropylenetriamine, dihexamethylenetriamine, triethylenetetramine, N,N'-bis(3-aminopropyl)ethylenediamine, tripropylenetetramine, tetraethylenepentamine, pentaethylenehexamine, tris(2-aminoethyl)amine, tris(3-aminopropyl)amine, N,N-dimethyl-1,3-propanediamine, and N,N-diethyl-1,3-propanediamine.

Examples of the polyamine compound that is represented by Chemical Formula (5) and has a cyclic structure include N-aminoethylpiperazine, N-2(2'-aminoethyl)aminoethylpiperazine, N,N'-bis(2-aminoethyl)piperazine, N-2(2'(2'')-aminoethyl)aminoethylpiperazine, N-2(2'-aminoethyl)aminoethyl-N'-aminoethylpiperazine, N,N'-bis(3-aminopropyl) piperazine, and N''-bis(2-aminoethyl)-N-aminoethylpiperazine.

Among the amine compounds [B3], DBU, 2-(tert-butyl)-1,1,3,3-tetramethylguanidine, 1,5,7-triazabicyclo[4.4.0]-deca-5-ene, ethylenediamine, diethylenetriamine, and 3,3-diaminopropylamine, triethylenetetramine are preferred in terms of solubility and high activity.

A mass ratio of the amine compound [B3] to the complex of the titanium compound [B1] and the ammonium hydroxide [B2] is, for example, 0.05 to 50, preferably 1 to 50, and more preferably 5 to 30. This mass ratio is, specifically for example, 0.05, 0.1, 0.5, 1, 5, 10, 20, 30, 40, or 50, and may be in the range between the two values exemplified herein.

3. Moisture-curable Composition

The moisture-curable composition of the present invention contains the curing catalyst [B] and the polymer [A] described above, and may also contain other additives described below, on an as-needed basis. The moisture-curable composition of the present invention may be prepared by mixing both under dry condition, and the form of mixing is not particularly limited. Usually, mixing in an atmosphere with a temperature of approximately 15 to 30° C. and a relative humidity of 60% or less is enough.

In the moisture-curable composition of the present invention, content of the curing catalyst [B] is preferably 0.1 to 20 pts.mass, more preferably 0.5 to 10 pts.mass, and even more preferably 3 to 8 pts.mass per 100 pts.mass of the polymer [A]. Curing performance is insufficient if the content of the curing catalyst [B] is less than 0.1 pts.mass, and recovery rate, physical property such as weather resistance, and stability during storage of the cured product may be deteriorated when the content of the curing catalyst [B] exceeds 20 pts.mass. The content of the curing catalyst [B] is, specifically for example, 0.1, 0.5, 1, 2, 3, 4, 5, 6, 7, 8, 9, 10, 11, 12, 13, 14, 15, 16, 17, 18, 19, or 20 pts.mass per 100 pts.mass of the polymer [A], and may be in the range between the two values exemplified herein.

In addition, the moisture-curable composition of the present invention may also contain a filler [C]. Examples of the filler [C] include calcium carbonate, kaolin, talc, fumed silica, precipitated silica, silicic anhydride, hydrous silicic acid, clay, calcined clay, glass, bentonite, organic bentonite, shirasu balloon, glass fiber, asbestos, glass filament, crushed quartz, diatomaceous earth, aluminum silicate, aluminum hydroxide, zinc oxide, magnesium oxide and titanium dioxide. The filler may be used singly or in combination with two or more kinds. Addition of the filler improves handling of the moisture-curable composition. The filler also functions as a rubber reinforcing agent. The biggest advantage is a cost reduction that is accomplished by a reduction in a quantity of a resin used, the reduction being due to addition of the filler as an extending agent.

Among them, calcium carbonate and titanium dioxide are preferred in terms of maintaining excellent non-tack surface, 50% modulus, workability, weather resistance and the like of the curable composition after curing. When calcium carbonate is used, a ratio thereof is preferably 1 to 200 pts.mass, and more preferably 50 to 200 pts.mass, per 100 pts.mass of the polymer [A]. Post-curing properties do not deteriorate if the ratio is in the range described above.

Other additives such as a curing catalyst, a curing accelerator, a colorant, a plasticizer, a curing retarder, an anti-sag agent, an anti-aging agent and a solvent, which are usually added to the curable composition, may be further added to the moisture-curable composition of the present invention.

Examples of other curing catalysts include metal curing catalysts such as organotin compounds such as dibutyltin dilaurate and dibutyltin bis(acetylacetonate); organoaluminum compounds such as aluminum tris(acetylacetonate) and aluminum tris (ethylacetoacetate); organozirconium compounds such as zirconium tetra(acetylacetonate) and zirconium tetrabutyrate; and amine compounds such as 1-amino-2-ethylhexane, 3-(trimethoxysilyl)propylamine, N-2-aminoethyl-3-aminopropyltrimethoxysilane, and 3-triethoxysilyl-N-(1,3-dimethylbutyldene)propylamine.

For example, various known amino group-substituted alkoxysilane compounds or condensation products thereof can be used as the curing accelerator. Specifically, exemplified are γ-aminopropyltrimethoxysilane, y-aminopropyltriethoxysilane, N-(trimethoxysilylpropyl)ethylenediamine, 5-aminobutyl(methyl)diethoxysilane, N,N-bis(trimethoxysilylpropyl)ethylenediamine and partial hydrolysates thereof, and these also have an effect of improving adhesion to a base material.

Specifically, iron oxide, carbon black, phthalocyanine blue, phthalocyanine green and the like are used as the colorant.

Specifically, phthalates such as dibutyl phthalate, dioctyl phthalate and butyl benzyl phthalate; fatty acid carboxylic acid esters such as dioctyl adipate, dioctyl succinate, diisodecyl succinate and butyl oleate; glycol esters such as pentaerythritol esters; phosphate esters such as trioctyl phosphate and tricresyl phosphate; epoxy plasticizers such as epoxidized soybean oil and benzyl epoxy stearate; chlorinated paraffin; and the like are used as the plasticizer.

Specifically, hydrogenated castor oil, silicic anhydride, organic bentonite, colloidal silica, and the like are used as the anti-sag agent.

Adhesion-imparting agents such as a phenolic resin and an epoxy resin; ultraviolet absorbers; radial chain inhibitors; peroxide decomposition agents; and various anti-aging agents are used as other additives.

The curable composition of the present invention is excellent in storability for being stable enough at room temperature, and if it contacts with moisture, curing reaction proceeds spontaneously by the formulated curing catalyst [B]. It has a short snap time (a time until it is semi-gelled and fluidity disappears) and a short tack-free time (a time until surface tack disappears), leading to excellent workability.

Based on the above-described properties, the curable composition of the present invention can be used as a one-pack type sealing material. Specifically, it is preferably used for application of sealing materials, adhesives, sealants, and waterproofing fillers for buildings, ships, and vehicles such as automobiles.

EXAMPLES

Hereinafter, examples of the present invention will be explained in detail, but the scope of the present invention is not limited thereto.

<Production Example 1 (Complex 1)>85.2 g (0.3 mol) of tetraisopropoxy titanium was charged into a 500 mL four-neck round-bottom flask equipped with a nitrogen introduction tube. While agitating, 70 g (0.1 mol) of a 371 tetrabutylammonium hydroxide (hereinafter referred to as TBAH) methanol solution was added in a dropwise manner over 30 minutes at an internal temperature of 60° C. Thereafter it was stirred for an hour under such a condition. Subsequently, a mixture thereof was concentrated under reduced pressure (final pressure reduction degree of 10 mmHg) to distill isopropanol and methanol, which leads to obtaining 80 g of Complex 1 of the titanium compound and TBAH. Further, 25 g of isopropanol was added thereto, thereby resulting in obtaining 105 g of transparent liquid.

The NMR measurement of TBAH was performed and the results are as follows: 1H NMR (400 MHz CDCl3): δ=3.35-3.31 (m, 8H), δ=1.70-1.64 (m, 8H), 5=1.46 (q, 7.4 Hz,8H), δ=1.02 (t, 7.4 Hz, 12H), δ=0 (TMS))

The NMR measurement of Complex 1 was performed and the results are as follows: 1H NMR (400 MHz CDCl3): δ 3.41-3.37 (m, 8H), 1.73-1.65 (m, 8H), 1.47 (q, 7.4 Hz, 8H), 1.01 (t, 7.3 Hz, 12H) δ=0 (TMS)

A chemical shift of TBAH in the range of 3.35 to 3.31 and a chemical shift of Complex 1 in a range of 3.41 to 3.37 are each attributed to α-hydrogen atoms in the butyl group of TBAH (hydrogen atoms in N—CH2). For this reason, it was confirmed that the chemical shift attributed to the α-hydrogen atoms of Complex 1 increased by +0.06 ppm, compared to that of TBAH.

<Production Example 2 (Complex 2)>

48.26 g (0.17 mol) of tetraisopropoxy titanium and 27.55 g (0.17 mol) of butylcarbitol were charged into a 200 mL four-neck round-bottom flask equipped with a nitrogen introduction tube in this order, and then were heated in an oil bath and stirred until an internal temperature reached 80° C. Thereafter a mixture thereof was concentrated under reduced pressure (final pressure reduction degree of 12 mmHg) to distill 10.2 g (0.17 mol) of isopropanol, thereby resulting in obtaining 65.10 g of colorless liquid in the 200 mL four-neck round-bottom flask.

41.5 g (0.056 mol) of a 35% tetrabutylammonium hydroxide methanol solution was weighed and charged thereinto, and then was fully mixed by a stirrer. Thereafter it was heated until the internal temperature reached 80° C., and was concentrated under reduced pressure (final pressure reduction degree of 10 mmHg) to distill isopropanol and methanol, thereby resulting in obtaining 65.44 g of Complex 2 of the titanium compound and TBAH.

The NMR measurement of Complex 2 was performed and the results are as follows: 1H NMR (400 MHz CDCl3): 3.41-3.37 (m, 8H), 1.74-1.66 (m, 8H), 1.47 (td, J=14.8, 7.4 Hz, 8H), 1.02 (t, J=7.3 Hz, 12H),5=0 (TMS)

A chemical shift of TBAH in the range of 3.35 to 3.31 and a chemical shift of Complex 2 in a range of 3.41 to 3.37 are each attributed to α-hydrogen atoms in the butyl group of TBAH (hydrogen atoms in N—CH2). For this reason, it was confirmed that the chemical shift attributed to the α-hydrogen atoms of Complex 2 increased by +0.06 ppm, compared to that of TBAH.

<Production Example 3 (Complex 3)>

58.0 g (0.20 mol) of tetraisopropoxy titanium and 15.0 g (0.092 mol) of butylcarbitol were charged into a 200 mL four-neck round-bottom flask equipped with a nitrogen introduction tube in this order, and then were heated in an oil bath and stirred until an internal temperature reached 80° C. Thereafter a mixture thereof was concentrated under reduced pressure (final pressure reduction degree of 7 mmHg) to distill 5.5 g (0.092 mol) of isopropanol, thereby resulting in obtaining 66.84 g of colorless liquid in the 200 mL four-neck round-bottom flask.

50.0 g (0.067 mol) of a 35% tetrabutylammonium hydroxide methanol solution was weighed and charged thereinto, and then was fully mixed by a stirrer. Thereafter it was heated until the internal temperature reached 80° C., and was concentrated under reduced pressure (final pressure reduction degree of 7 mmHg) to distill isopropanol and methanol, thereby resulting in obtaining 62.96 g of Complex 3 of the titanium compound and TBAH.

The NMR measurement of Complex 3 was performed and the results are as follows: 1H NMR (400 MHz CDCl3): 3.42-3.37 (m, 8H), 1.73-1.65 (m, 8H), 1.47 (td, J=14.8, 7.5 Hz, 8H), 1.01 (t, J=7.4 Hz, 12H), A chemical shift of TBAH in the range of 3.35 to 3.31 and a chemical shift of Complex 3 in a range of 3.42 to 3.37 are each attributed to α-hydrogen atoms in the butyl group of TBAH (hydrogen atoms in N—CH2). For this reason, it was confirmed that the chemical shift attributed to the α-hydrogen atoms of Complex 3 increased by +0.07 ppm, compared to that of TBAH.

<Production Example 4 (Complex 4)>

38.7 g (0.136 mol) of tetraisopropoxy titanium and 10.0 g (0.062 mol) of butylcarbitol were charged into a 200 mL four-neck round-bottom flask equipped with a nitrogen introduction tube in this order, and then were heated in an oil bath and stirred until an internal temperature reached 80° C. Thereafter a mixture thereof was concentrated under reduced pressure (final pressure reduction degree of 7 mmHg) to distill 3.7 g (0.062 mol) of isopropanol, thereby resulting in obtaining 44.56 g of colorless liquid in the 200 mL four-neck round-bottom flask.

40.0 g (0.054 mol) of a 35% tetrabutylammonium hydroxide methanol solution was weighed and charged thereinto, and then was fully mixed by a stirrer. Thereafter it was heated until the internal temperature reached 80° C., and was concentrated under reduced pressure (final pressure reduction degree of 16 mmHg) to distill isopropanol and methanol, thereby resulting in obtaining 44.12 g of Complex 4 of the titanium compound and TBAH.

The NMR measurement of Complex 4 was performed and the results are as follows: 1H NMR (400 MHz CDCl3): 3.41-3.37 (m, 8H), 1.73-1.65 (m, 8H), 1.47 (q, J=7.3 Hz, 8H), 1.01 (t, J=7.3 Hz, 12H),5=0 (TMS)

A chemical shift of TBAH in the range of 3.35 to 3.31 and a chemical shift of Complex 4 in a range of 3.41 to 3.37 are each attributed to α-hydrogen atoms in the butyl group of TBAH (hydrogen atoms in N—CH2). For this reason, it was confirmed that the chemical shift attributed to the α-hydrogen atoms of Complex 4 increased by +0.06 ppm, compared to that of TBAH.

(Preparation of Moisture-curable Composition)

The moisture-curable composition was prepared by blending each component obtained in Production Examples described above and commercially available components in a blending ratio (pts.mass) shown in Tables 1 to 4 and by kneading them. It should be noted that operations of blending, kneading, and curing of materials were performed in an atmosphere of a temperature of 25±1° C. and a relative humidity of 50 to 60%.

<Measurement of Tack-free Time>

The tack-free time (the time required from the end of kneading to a point where a sample no longer adheres to a fingertip when three points on a surface are lightly touched by the fingertip cleaned with ethyl alcohol) was measured for the obtained moisture-curable composition. Measurement results of the tack-free time are shown in Tables 1 to 4.

Comparing the tack-free times between Examples and Comparative Examples, the tack-free times in all Examples are shorter than those in Comparative Examples. It was confirmed that a high catalyst performance is achieved by jointly using the complex and specific amine compound [B3].

TABLE 1

| | | | Examples | | | | | | | | | | | | |
|---|---|---|---|---|---|---|---|---|---|---|---|---|---|---|---|
| | | | 1 | 2 | 3 | 4 | 5 | 6 | 7 | 8 | 9 | 10 | 11 | 12 |
| Polymer [A] | [A1] | MS Polymer SAX520 | 100 | 100 | 100 | 100 | 100 | 100 | 100 | 100 | 100 | 100 | 100 | 100 |
| Curing Catalyst [B] | | Complex 1 | 3.6 | 3.6 | 3.6 | 3.6 | 3.6 | 3.6 | | | | | | |
| | | Complex 2 | | | | | | | 3.6 | 3.6 | 3.6 | 3.6 | 3.6 | 3.6 |
| | [B3] | DBU | 0.4 | | | | | | 0.4 | | | | | |
| | | 1,1,3,3-Tetramethylguanidine | | 0.4 | | | | | | 0.4 | | | | |
| | | 2-(Tert-Butyl)-1,1,3,3-Tetramethylguanidine | | | 0.4 | | | | | | 0.4 | | | |
| | | 1,5,7-Triazabicyclo[4.4.0]-deca-5-ene | | | | 0.4 | | | | | | 0.4 | | |
| | | Ethylenediamine | | | | | 0.4 | | | | | | 0.4 | |
| | | 3,3-Diaminopropylamine | | | | | | 0.4 | | | | | | 0.4 |
| Filler | Calcium Carbonate | CARLEX 300 | 122 | 122 | 122 | 122 | 122 | 122 | 122 | 122 | 122 | 122 | 122 | 122 |
| | Titanium Oxide | FR-41 | 20 | 20 | 20 | 20 | 20 | 20 | 20 | 20 | 20 | 20 | 20 | 20 |
| Other Additives | Plasticizer | DINP | 42 | 42 | 42 | 42 | 42. | 42. | 42 | 42 | 42. | 42 | 42 | 42 |
| | Anti-sag Agent | DISPARLON 6500 | 1 | 1 | 1 | 1 | 1 | 1 | 1 | 1 | 1 | 1 | 1 | 1 |
| | Ultraviolet Absorber | Songsorb 3260P | 1 | 1 | 1 | 1 | 1 | 1 | 1 | 1 | 1 | 1 | 1 | 1 |
| | Light Stabilizer | Sabostab UV70 | 1 | 1 | 1 | 1 | 1 | 1 | 1 | 1 | 1 | 1 | 1 | 1 |

TABLE 1-continued

|  |  |  | Examples | | | | | | | | | | | |
|---|---|---|---|---|---|---|---|---|---|---|---|---|---|---|
|  |  |  | 1 | 2 | 3 | 4 | 5 | 6 | 7 | 8 | 9 | 10 | 11 | 12 |
|  | Antioxidant | Irganox245 | 1 | 1 | 1 | 1 | 1 | 1 | 1 | 1 | 1 | 1 | 1 | 1 |
|  | Dehydrating Agent | KBM-1003 | 2.3 | 2.3 | 2.3 | 2.3 | 2.3 | 2.3 | 2.3 | 2.3 | 2.3 | 2.3 | 2.3 | 2.3 |
|  | Adhesion-imparting Agent | KBM-903 | 3.2 | 3.2 | 3.2 | 3.2 | 3.2 | 3.2 | 3.2 | 3.2 | 3.2 | 3.2 | 3.2 | 3.2 |
|  | Tack-free Time (min) |  | 15 | 25 | 20 | 20 | 35 | 45 | 20 | 30 | 25 | 25 | 40 | 50 |

TABLE 2

|  |  |  | Examples | | | | | | | | | | | |
|---|---|---|---|---|---|---|---|---|---|---|---|---|---|---|
|  |  |  | 13 | 14 | 15 | 16 | 17 | 18 | 19 | 20 | 21 | 22 | 23 | 24 |
| Polymer [A] | [A1] | MS Polymer SAX520 | 100 | 100 | 100 | 100 | 100 | 100 | 100 | 100 | 100 | 100 | 100 | 100 |
| Curing Catalyst [B] |  | Complex 3 | 3.6 | 3.6 | 3.6 | 3.6 | 3.6 | 3.6 |  |  |  |  |  |  |
|  |  | Complex 4 |  |  |  |  |  |  | 3.6 | 3.6 | 3.6 | 3.6 | 3.6 | 3.6 |
|  | [B3] | DBU | 0.4 |  |  |  |  |  | 0.4 |  |  |  |  |  |
|  |  | 1,1,3,3-Tetramethylguanidine |  | 0.4 |  |  |  |  |  | 0.4 |  |  |  |  |
|  |  | 2-(Tert-Buty)-1,1,3,3-Tetramethylguanidine |  |  | 0.4 |  |  |  |  |  | 0.4 |  |  |  |
|  |  | 1,5,7-Triazabicyclo[4.4,0]-deca-5-ene |  |  |  | 0.4 |  |  |  |  |  | 0.4 |  |  |
|  |  | Ethylenediamine |  |  |  |  | 0.4 |  |  |  |  |  | 0.4 |  |
|  |  | 3,3-Diaminopropylamine |  |  |  |  |  | 0.4 |  |  |  |  |  | 0.4 |
| Filler | Calcium Carbonate | CARLEX 300 | 122 | 122 | 122 | 122 | 122 | 122 | 122 | 122 | 122 | 122 | 122 | 122 |
|  | Titanium Oxide | FR-41 | 20 | 20 | 20 | 20 | 20 | 20 | 20 | 20 | 20 | 20 | 20 | 20 |
| Other Additives | Plasticizer | DINP | 42 | 42 | 42 | 42 | 42 | 42 | 42 | 42 | 42 | 42 | 42 | 42 |
|  | Anti-sag Agent | DISPARLON 6500 | 1 | 1 | 1 | 1 | 1 | 1 | 1 | 1 | 1 | 1 | 1 | 1 |
|  | Ultraviolet Absorber | Songsorb 3260P | 1 | 1 | 1 | 1 | 1 | 1 | 1 | 1 | 1 | 1 | 1 | 1 |
|  | Light Stabilizer | Sabostab UV70 | 1 | 1 | 1 | 1 | 1 | 1 | 1 | 1 | 1 | 1 | 1 | 1 |
|  | Antioxidant | Irganox245 | 1 | 1 | 1 | 1 | 1 | 1 | 1 | 1 | 1 | 1 | 1 | 1 |
|  | Dehydrating Agent | KBM-1003 | 2.3 | 2.3 | 2.3 | 2.3 | 2.3 | 2.3 | 2.3 | 2.3 | 2.3 | 2.3 | 2.3 | 2.3 |
|  | Adhesion-imparting Agent | KBM-903 | 3.2 | 3.2 | 3.2 | 3.2 | 3.2 | 3.2 | 3.2 | 3.2 | 3.2 | 3.2 | 3.2 | 3.2 |
|  | Tack-free Time (min) |  | 15 | 25 | 20 | 20 | 35 | 45 | 10 | 20 | 15 | 15 | 25 | 35 |

TABLE 3

|  |  |  | Examples | | | | | | | | | | | |
|---|---|---|---|---|---|---|---|---|---|---|---|---|---|---|
|  |  |  | 25 | 26 | 27 | 28 | 29 | 30 | 31 | 32 | 33 | 34 | 35 | 36 |
| Polymer [A] | [A1] | MS Polymer SAX520 | 80 | 80 | 80 | 80 | 80 | 80 |  |  |  |  |  |  |
|  |  | MS Polymer S303 | 20 | 20 | 20 | 20 | 20 | 20 |  |  |  |  |  |  |
|  | [A2] | KE-66 |  |  |  |  |  |  | 100 | 100 | 100 | 100 | 100 | 100 |
| Curing Catalyst [B] |  | Complex 3 | 3.6 | 3.6 | 3.6 | 3.6 | 3.6 | 3.6 | 0.9 | 0.9 | 0.9 | 0.9 | 0.9 | 0.9 |
|  | [B3] | DBU | 0.4 |  |  |  |  |  | 0.1 |  |  |  |  |  |
|  |  | 1,1,3,3-Tetramethylguanidine |  | 0.4 |  |  |  |  |  | 0.1 |  |  |  |  |
|  |  | 2-(Tert-Butyl)-1,1,3,3-Tetramethylguanidine |  |  | 0.4 |  |  |  |  |  | 0.1 |  |  |  |
|  |  | 1,5,7-Triazabicyclo[4.4.0]-deca-5-ene |  |  |  | 0.4 |  |  |  |  |  | 0.1 |  |  |
|  |  | Ethylenediamine |  |  |  |  | 0.4 |  |  |  |  |  | 0.1 |  |
|  |  | 3,3-Diaminopropylamine |  |  |  |  |  | 0.4 |  |  |  |  |  | 0.1 |

TABLE 3-continued

|  |  |  | Examples |  |  |  |  |  |  |  |  |  |  |  |
|---|---|---|---|---|---|---|---|---|---|---|---|---|---|---|
|  |  |  | 25 | 26 | 27 | 28 | 29 | 30 | 31 | 32 | 33 | 34 | 35 | 36 |
| Filler | Calcium Carbonate | CARLEX 300 | 122 | 122 | 122 | 122 | 122 | 122 | 122 | 122 | 122 | 122 | 122 | 122 |
|  | Titanium Oxide | FR-41 | 20 | 20 | 20 | 20 | 20 | 20 | 20 | 20 | 20 | 20 | 20 | 20 |
| Other Additives | Plasticizer | DINP | 42 | 42 | 42 | 42 | 42 | 42 | 42 | 42 | 42 | 42 | 42 | 42 |
|  | Anti-sag Agent | Hydrogenated Castor Oil |  |  |  |  |  |  | 4 | 4 | 4 | 4 | 4 | 4 |
|  |  | DISPARLON 6500 | 1 | 1 | 1 | 1 | 1 | 1 | 1 | 1 | 1 | 1 | 1 | 1 |
|  | Ultraviolet Absorber | Songsorb 3260P | 1 | 1 | 1 | 1 | 1 | 1 |  |  |  |  |  |  |
|  | Light Stabilizer | Sabostab UV70 | 1 | 1 | 1 | 1 | 1 | 1 |  |  |  |  |  |  |
|  | Antioxidant | Irganox245 | 1 | 1 | 1 | 1 | 1 | 1 |  |  |  |  |  |  |
|  | Dehydrating Agent | KBM-1003 | 2.3 | 2.3 | 2.3 | 2.3 | 2.3 | 2.3 |  |  |  |  |  |  |
|  | Adhesion-imparting Agent | KBM-903 | 3.2 | 3.2 | 3.2 | 3.2 | 3.2 | 3.2 |  |  |  |  |  |  |
|  |  | KBM603 |  |  |  |  |  |  | 0.5 | 0.5 | 0.5 | 0.5 | 0.5 | 0.5 |
|  | Anti-aging Agent | Nocrac NS-6 |  |  |  |  |  |  | 0.5 | 0.5 | 0.5 | 0.5 | 0.5 | 0.5 |
|  | Liquid Paraffin | Smoil P-350 |  |  |  |  |  |  | 2 | 2 | 2 | 2 | 2 | 2 |
|  | Tack-free Time (min) |  | 20 | 30 | 25 | 30 | 55 | 60 | 5 | 10 | 5 | 10 | 10 | 10 |

TABLE 4

|  |  |  | Examples |  |  |  |  |  | Comparative Examples |  |  |  |  |
|---|---|---|---|---|---|---|---|---|---|---|---|---|---|
|  |  |  | 37 | 38 | 39 | 40 | 41 | 42 | 1 | 2 | 3 | 4 | 5 |
| Polymer | [A1] | MS Polymer SAX520 |  |  |  |  |  |  | 100 | 100 | 100 | 100 | 100 |
| [A] |  | STP-E15 | 100 | 100 | 100 | 100 | 100 | 100 |  |  |  |  |  |
| Curing catalyst [B] |  | Complex 1 |  |  |  |  |  |  | 4 |  |  |  |  |
|  |  | Complex 2 |  |  |  |  |  |  |  | 4 |  |  |  |
|  |  | Complex 3 | 1.8 | 1.8 | 1.8 | 1.8 | 1.8 | 1.8 |  |  | 4 |  |  |
|  |  | Complex 4 |  |  |  |  |  |  |  |  |  | 4 | 3.6 |
|  | [B3] | DBU | 0.2 |  |  |  |  |  |  |  |  |  |  |
|  |  | 1,1,3,3-Tetramethylguanidine |  | 0.2 |  |  |  |  |  |  |  |  |  |
|  |  | 2-(Tert-Butyl)-1,1,3,3-Tetramethylquanidine |  |  | 0.2 |  |  |  |  |  |  |  |  |
|  |  | 1,5,7-Triazabicyclo[4.4.0]-deca-5-ene |  |  |  | 0.2 |  |  |  |  |  |  |  |
|  |  | Ethylenediamine |  |  |  |  | 0.2 |  |  |  |  |  |  |
|  |  | 3,3-Diaminopropylamine |  |  |  |  |  | 0.2 |  |  |  |  |  |
| Other Catalysts |  | Octylamine |  |  |  |  |  |  |  |  |  |  | 0.4 |
| Filler | Calcium Carbonate | CARLEX 300 | 175 | 175 | 175 | 175 | 175 | 175 | 122 | 122 | 122 | 122 | 122 |
|  | Titanium Oxide | FR-41 |  |  |  |  |  |  | 20 | 20 | 20 | 20 | 20 |
|  | Fumed Silica | REOLOSIL PM-20 | 12 | 12 | 12 | 12 | 12 | 12 |  |  |  |  |  |
| Other Additives | Plasticizer | DINP |  |  |  |  |  |  | 42 | 42 | 42 | 42 | 42 |
|  |  | PPG1000 | 99 | 99 | 99 | 99 | 99 | 99 |  |  |  |  |  |
|  | Anti-sag Agent | DISPARLON 6500 |  |  |  |  |  |  | 1 | 1 | 1 | 1 | 1 |
|  | Ultraviolet Absorber | Songsorb 3260P | 0.4 | 0.4 | 0.4 | 0.4 | 0.4 | 0.4 | 1 | 1 | 1 | 1 | 1 |
|  | Light Stabilizer | Sabostab UV70 | 0.4 | 0.4 | 0.4 | 0.4 | 0.4 | 0.4 | 1 | 1 | 1 | 1 | 1 |
|  | Antioxidant | Irganox245 |  |  |  |  |  |  | 1 | 1 | 1 | 1 | 1 |
|  | Dehydrating Agent | KBM-1003 | 8 | 8 | 8 | 8 | 8 | 8 | 2.3 | 2.3 | 2.3 | 2.3 | 2.3 |

TABLE 4-continued

|  |  | Examples | | | | | | Comparative Examples | | | | |
| --- | --- | --- | --- | --- | --- | --- | --- | --- | --- | --- | --- | --- |
|  |  | 37 | 38 | 39 | 40 | 41 | 42 | 1 | 2 | 3 | 4 | 5 |
| Adhesion-imparting Agent | KBM-903 | 4 | 4. | 4 | 4 | 4 | 4 | 3.2 | 3.2 | 3.2 | 3.2 | 3.2 |
| Tack-free Time (min) |  | 5 | 5 | 5 | 10 | 10 | 10 | 70 | 70 | 70 | 70 | 90 |

Hereinafter, materials in the tables will be described in detail.
(Polymer [A])
MS polymer SAX520: a silyl group-containing organic polymer (made by Kaneka Corporation)
MS polymer S303: a silyl group-containing organic polymer (made by Kaneka Corporation)
KE-66: an organopolysiloxane (made by Shin-Etsu Chemical Co., Ltd.)
STP-E15: a silyl group-containing organic polymer (made by Wacker Chemical Corp.)
(Curing Catalyst [B])
Complexes 1 to 4: products produced in Production Examples 1 to 4.
DBU: made by Tokyo Chemical Industry Co., Ltd.
1,1,3,3-tetramethylguanidine: made by Tokyo Chemical Industry Co., Ltd.
2-(tert-butyl)-1,1,3,3-tetramethylguanidine: made by Sigma-Aldrich, Inc.
1,5,7-triazabicyclo[4.4.0]-deca-5-ene: made by Tokyo Chemical Industry Co., Ltd.
Ethylenediamine: made by Tokyo Chemical Industry Co., Ltd.
3,3-diaminopropylamine: made by Tokyo Chemical Industry Co., Ltd.
(Other Catalysts)
Octylamine: made by Tokyo Chemical Industry Co., Ltd.
(Filler)
CARLEX300: calcium carbonate (made by Maruo Calcium Co., Ltd.)
FR-41: titanium oxide (made by Furukawa Chemicals Co., Ltd.)
(Other Additives)
DINP: plasticizer (made by J-PLUS Co., Ltd.)
PPG1000: plasticizer (made by Kishida Chemical Co., Ltd.)
DISPARLON 6500: anti-sag agent (made by Kusumoto Chemicals Co. Ltd.)
Hydrogenated castor oil: anti-sag agent (made by Itoh Oil Chemicals Co., Ltd.)
Songsorb 3260P: ultraviolet absorber (made by Songwon Industrial Co., Ltd.)
Songstab UV70: light stabilizer (made by Songwon Industrial Co., Ltd.)
Irganox245: antioxidant (made by BASF Japan Co., Ltd.)
KBM-1003: dehydrating agent (made by Shin-Etsu Silicone Co., Ltd.)
KBM-903: adhesion-imparting agent (made by Shin-Etsu Silicone Co., Ltd.)
KBM-603: adhesion-imparting agent (made by Shin-Etsu Silicone Co., Ltd.)
Nocrac NS-6: anti-aging agent (made by Ouchi Shinko Chemical Industrial Co., Ltd.)
Smoil P 350P: liquid paraffin (made by Matsumura Oil Co., Ltd.)

The invention claimed is:

1. A curing catalyst [B] used for curing a polymer [A] having a reactive hydrolyzable silicon-containing group, wherein:

the curing catalyst [B] contains a complex of a (1.) titanium compound and (2.) an ammonium hydroxide [B2], and an amine compound [B3];

the titanium compound [B1] is represented by Chemical Formula (1);

the ammonium hydroxide [B2] is represented by Chemical Formula (2); and the amine compound [B3] is represented by Chemical Formula (3), Chemical Formula (4), or Chemical Formula (5);

$$(R^1-O)_n Ti-A_{4-n} \quad (1)$$

in Chemical Formula (1), $R^1$ is a substituted or unsubstituted hydrocarbon group, n is 1 to 4, and A is a β-diketone group;

[Chem. 2]

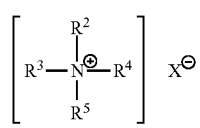

(2)

in Chemical Formula (2), $R^2$, $R^3$, $R^4$ and $R^5$ represent substituted or unsubstituted hydrocarbon groups having 1 to 8 carbon atoms, which are the same as or different from each other, and X represents a hydroxyl group;

[Chem. 3]

$$R^6-N=CR^7-NR^8{}_2 \quad (3)$$

in chemical Formula (3), $R^6$, $R^7$, and $R^8$ represent hydrogen atoms or substituted or unsubstituted hydrocarbon groups having 1 to 20 carbon atoms, which are the same as or different from each other, the two $R^8$ may be the same as or different from each other, and any two or more of $R^6$, $R^7$ and the two $R^8$ may be bonded to each other to form a cyclic structure;

[Chem. 4]

(4)

in Chemical Formula (4), $R^9$, $R^{10}$, and $R^{11}$ represent hydrogen atoms or substituted or unsubstituted hydrocarbon groups having 1 to 20 carbon atoms, which are the same as or different from each other, the two $R^9$ and the two $R^{11}$ may each be the same as or different from each other, and any two or more of the two $R^9$, $R^{10}$ and the two $R^{11}$ may be bonded to each other to form a cyclic structure;

[Chem. 5]

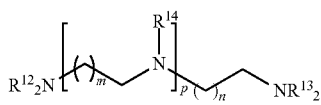
(5)

in Chemical Formula (5), $R^{12}$, $R^{13}$, and $R^{14}$ represent hydrogen atoms or substituted or unsubstituted hydrocarbon groups having 1 to 10 carbon atoms, which are the same as or different from each other, m is 1 to 10, n is 1 to 10, p is 0 to 10, and any two or more of the two $R^{12}$, the two $R^{13}$, and the p number of $R^{14}$ may be bonded to each other to form a cyclic structure.

2. The curing catalyst [B] of claim 1, wherein the complex is a reaction product obtained by reacting a mixture of the titanium compound [B1] and the ammonium hydroxide [B2] at a temperature of 40 to 100° C.

3. The curing catalyst [B] of claim 2, wherein a molar ratio of the titanium compound [B1] to the ammonium hydroxide [B2] is 0.1 to 100.

4. The curing catalyst [B] of claim 1, wherein a mass ratio of the amine compound [B3] to the complex is 0.05 to 50.

5. A moisture-curable composition containing the curing catalyst [B] of claim 1 and the polymer [A].

6. A method of producing a cured product, the method comprising a step of bringing the moisture-curable composition of claim 5 into contact with moisture.

7. A method of producing a curing catalyst [B] used for curing a polymer [A] having a reactive hydrolyzable silicon-containing group, the method comprising a step of mixing a complex of a titanium compound [B1]] and an ammonium hydroxide [B2] with an amine compound [B3] to obtain the curing catalyst [B], wherein:

the titanium compound [B1] is represented by Chemical Formula (1);

the ammonium hydroxide [B2] is represented by Chemical Formula (2); and the amine compound [B3] is represented by Chemical Formula (3), Chemical Formula (4), or Chemical Formula (5);

$$(R^1-O)_n Ti-A_{4-n} \quad (1)$$

in Chemical Formula (1), R' is a substituted or unsubstituted hydrocarbon group, n is 1 to 4, and A is a β-diketone group;

[Chem. 2]

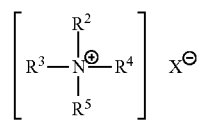
(2)

in Chemical Formula (2), $R^2$, $R^3$, $R^4$ and $R^5$ represent substituted or unsubstituted hydrocarbon groups having 1 to 8 carbon atoms, which are the same as or different from each other, and X represents a hydroxyl group;

[Chem. 3]

(3)

in chemical Formula (3), $R^6$, $R^7$, and $R^8$ represent hydrogen atoms or substituted or unsubstituted hydrocarbon groups having 1 to 20 carbon atoms, which are the same as or different from each other, two $R^8$ may be the same as or different from each other, and any two or more of $R^6$, $R^7$ and two $R^8$ may be bonded to each other to form a cyclic structure;

[Chem. 4]

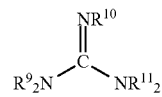
(4)

in Chemical Formula (4), $R^9$, $R^{10}$, and $R^{11}$ represent hydrogen atoms or substituted or unsubstituted hydrocarbon groups having 1 to 20 carbon atoms, which are the same as or different from each other, two $R^9$ and two $R^{11}$ may each be the same as or different from each other, and any two or more of the two $R^9$, $R^{10}$ and the two $R^{11}$ may be bonded to each other to form a cyclic structure;

[Chem. 5]

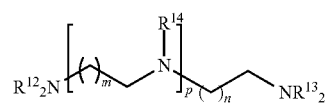
(5)

in Chemical Formula (5), $R^{12}$, $R^{13}$, and $R^{14}$ represent hydrogen atoms or substituted or unsubstituted hydrocarbon groups having 1 to 10 carbon atoms, which are the same as or different from each other, m is 1 to 10, n is 1 to 10, p is 0 to 10, and any two or more of the two $R^{12}$, the two $R^{13}$, and the p number of $R^{14}$ may be bonded to each other to form a cyclic structure.

* * * * *